US010935149B2

United States Patent
Yager et al.

(10) Patent No.: US 10,935,149 B2
(45) Date of Patent: Mar. 2, 2021

(54) TEMPERATURE-ACTUATED VALVE, FLUIDIC DEVICE, AND RELATED METHODS OF USE

(71) Applicant: University of Washington, Seattle, WA (US)

(72) Inventors: Paul Yager, Seattle, WA (US); Joshua Bishop, Seattle, WA (US); Michael Purfield, Seattle, WA (US)

(73) Assignee: University of Washington, Seattle, WA (US)

( * ) Notice: Subject to any disclaimer, the term of this patent is extended or adjusted under 35 U.S.C. 154(b) by 93 days.

(21) Appl. No.: 16/354,987

(22) Filed: Mar. 15, 2019

(65) Prior Publication Data

US 2019/0285187 A1    Sep. 19, 2019

Related U.S. Application Data

(60) Provisional application No. 62/643,551, filed on Mar. 15, 2018.

(51) Int. Cl.
| | |
|---|---|
| *F16K 17/38* | (2006.01) |
| *F16K 99/00* | (2006.01) |
| *B01L 3/00* | (2006.01) |

(52) U.S. Cl.
CPC ........ *F16K 17/383* (2013.01); *F16K 99/0036* (2013.01); *B01L 3/5023* (2013.01);
(Continued)

(58) Field of Classification Search
CPC .. F16K 17/383; F16K 99/0036; F16K 99/003; F16K 99/0044; F16K 2099/0082;
(Continued)

(56) References Cited

U.S. PATENT DOCUMENTS

| 5,182,910 A * | 2/1993 | Benecke | B23Q 1/36 251/11 |
| 5,325,880 A * | 7/1994 | Johnson | F15C 3/04 137/1 |

(Continued)

FOREIGN PATENT DOCUMENTS

| WO | 1998/53311 A2 | 11/1998 |
| WO | 2001/28683 A1 | 4/2001 |
| WO | 2017/184665 A1 | 10/2017 |

OTHER PUBLICATIONS

Jahanshahi-Anbuhi, S., et al., "Paper-Based Microfluidics With an Erodible Polymeric Bridge Giving Controlled Release and Timed Flow Shutoff," Lab on a Chip 14(1):229-236, 2014.

(Continued)

*Primary Examiner* — Minh Q Le
(74) *Attorney, Agent, or Firm* — Christensen O'Connor Johnson Kindness PLLC

(57) ABSTRACT

Temperature-actuated valves, devices including temperature-actuated valves, and related methods are described. In an embodiment, the temperature-actuated valve includes a heat-shrink film defining a perforation extending at least partially in a first direction. In an embodiment, the temperature-actuated valve is configured to open when a portion of the heat-shrink film including the perforation is heated above a threshold temperature to contract the heat-shrink film along a second direction perpendicular to the first direction to define an aperture, in an open configuration, providing a fluid a path through the heat-shrink film. In an embodiment, the temperature-actuated valve includes a leakage-mitigation feature configured to limit fluid flow through the perforation when the valve is in a closed configuration.

22 Claims, 9 Drawing Sheets

(52) U.S. Cl.
CPC . *B01L 2200/027* (2013.01); *B01L 2300/1827* (2013.01); *B01L 2400/0677* (2013.01); *F16K 2099/0082* (2013.01)

(58) Field of Classification Search
CPC ..... F16K 2099/0084; B01L 2400/0677; B01L 2400/0406; B01L 2300/1827; B01L 2300/047; B01L 2300/0825; B01L 2300/087; B01L 2200/027; B01L 2200/0621; B01L 3/5023; B01L 3/5029
USPC .................. 137/73, 341, 487.5, 80; 426/118; 383/100, 103
See application file for complete search history.

(56) References Cited

U.S. PATENT DOCUMENTS

| | | | |
|---|---|---|---|
| 6,361,958 | B1 | 3/2002 | Shieh et al. |
| 6,454,759 | B2 | 9/2002 | Krulevitch et al. |
| 6,734,401 | B2 | 5/2004 | Bedingham et al. |
| 7,045,190 | B2* | 5/2006 | Inagaki ................ B65D 77/225 220/202 |
| 7,244,223 | B2* | 7/2007 | Hartman .............. B65D 77/225 383/103 |
| 7,709,069 | B2* | 5/2010 | Schmal ................... B32B 27/32 428/35.7 |
| 8,197,925 | B2* | 6/2012 | Sankey ................... B32B 27/36 428/138 |
| 8,439,063 | B2* | 5/2013 | Seline ................ B65D 81/3446 137/72 |
| 2002/0103412 | A1* | 8/2002 | Trimmer ............... F04B 43/043 600/16 |
| 2002/0173047 | A1* | 11/2002 | Hudak .................. B01L 3/5023 436/178 |
| 2003/0129767 | A1* | 7/2003 | Bautista ................ B01L 3/5023 436/178 |
| 2004/0053290 | A1 | 3/2004 | Terbruggen et al. |
| 2005/0013732 | A1 | 1/2005 | Battrell et al. |
| 2005/0069913 | A1 | 3/2005 | Mian et al. |
| 2006/0228057 | A1* | 10/2006 | Newrones ............ B65D 77/225 383/103 |
| 2007/0095393 | A1 | 5/2007 | Zucchelli et al. |
| 2007/0219623 | A1 | 9/2007 | Palmaz |
| 2007/0238112 | A1 | 10/2007 | Sohn et al. |
| 2008/0160601 | A1* | 7/2008 | Handique ................ H05B 3/22 435/287.2 |
| 2008/0280285 | A1 | 11/2008 | Chen et al. |
| 2008/0302423 | A1* | 12/2008 | Gerhardt ............. F16K 99/0021 137/13 |
| 2009/0227948 | A1 | 9/2009 | Chen et al. |
| 2010/0242407 | A1* | 9/2010 | Binger ............... B65D 81/2038 53/405 |
| 2013/0224848 | A1 | 8/2013 | Gandini et al. |
| 2013/0273644 | A1 | 10/2013 | Barnes et al. |
| 2014/0287966 | A1 | 9/2014 | Gray et al. |
| 2014/0329301 | A1 | 11/2014 | Handique |
| 2015/0321193 | A1 | 11/2015 | Sprague et al. |
| 2015/0361487 | A1 | 12/2015 | Bishop et al. |
| 2015/0375226 | A1* | 12/2015 | Yoo .................... G01N 35/1097 436/45 |
| 2016/0090588 | A1 | 3/2016 | Lofquist et al. |
| 2016/0193604 | A1* | 7/2016 | McFarland ............ G02B 21/32 359/385 |
| 2016/0326477 | A1 | 11/2016 | Fernandez-Alcon et al. |
| 2016/0339423 | A1 | 11/2016 | Quake et al. |
| 2017/0014822 | A1* | 1/2017 | Ker .................... G01N 27/3272 |
| 2017/0159847 | A1* | 6/2017 | Alexeenko ............... B64G 1/10 |
| 2018/0100601 | A1* | 4/2018 | Aguirre ................ F16K 99/003 |
| 2019/0126270 | A1* | 5/2019 | Linnes ................. C12Q 1/6846 |

OTHER PUBLICATIONS

Pitchaimani, K., et al., "Manufacturable Plastic Microfluidic Valves Using Thermal Actuation," Lab on a Chip 9:3082-3087, 2009.
Whitesides, G.M., "The Origins and the Future of Microfluidics," Nature 442:368-373, 2006.
Cate, D.M., et al., "Recent Developments in Paper-Based Microfluidic Devices," Analytical Chemistry 87(1):9-41, 2015.
Toley, B.J., et al., "A Versatile Valving Toolkit for Automating Fluidic Operations in Paper Microfluidic Devices," Lab on a Chip 15(6):1432-1444, 2015. (Author Manuscript provided, PMCID: PMC4391506, available in PMC Mar. 21, 2016, 26 pages.).
Tang, R., et al., "A Fully Disposable and Integrated Paper-Based Device for Nucleic Acid Extraction, Amplification and Detection," Lab on a Chip 17:1270-1279, 2017.
Lafleur, L.K., et al., "A Rapid, Instrument-Free, Sample-to-Result Nucleic Acid Amplification Test," Lab on a Chip 16(19):3777-3787, 2016.
Waggoner, J.J., et al., "Multiplex Nucleic Acid Amplification Test for Diagnosis of Dengue Fever, Malaria, and Leptospirosis," Journal of Clinical Microbiology 52(6):2011-2018, 2014.
Weidemaier, K., et al., "Advancing Rapid Point-of-Care Viral Diagnostics to a Clinical Setting," Future Virology 10(3):313-328, 3015.
St. John, A., and C.P. Price, "Existing and Emerging Technologies for Point-of-Care Testing," Clinical Biochemical Reviews 35(3):155-167, 2014.
Papp, J.R., et al., "Recommendations for the Laboratory-Based Detection of Chlamydia trachomatis and Neisseria gonorrhoeae," Morbidity and Mortality Weekly Report 63(2):1-19, 2014.
Kaczka, K., et al., "One-Step Nucleic Acid Amplification Testing in Medullary Thyroid Cancer Lymph Nodes: A Case Series," Archives of Medical Science 11(1):137-141, 2015.
Leineweber, W., and M. Williams, "Assured Bacterial Detection Towards Paper-Based Microfluidic Chip for Resource-Limited Areas," Bioengineering Senior Theses, Jun. 1, 2015, Santa Clara University, 59 pages.
Fernandes, S.C., et al., "Beyond Wicking: Expanding the Role of Patterned Paper as the Foundation for an Analytical Platform," Analytical Chemistry 89(11):5654-5664, 2017.
Brenes, N.J., "Paper Analytical Devices for Rapid, Quantitative Electrochemical Detection of DNA and Bacteria," Biochemistry Thesis, Dec. 2016, University of Texas at Austin, 71 pages.
Mu, X., and Y.S. Zhang, "Fabrication and Applications of Paper-Based Microfluidics," in F. Piraino and S. Selimovic (eds.), "Devices With Microfluidics," CRC Press, Taylor & Francis Group, pp. 67-86, 2017.
Fu, E., et al., "Enhanced Sensitivity of Lateral Flow Tests Using a Two-Dimensional Paper Network Format," Analytical Chemistry 83:7941-7946, 2011.
Rohrman, B.A., et al., "A Lateral Flow Assay for Quantitative Detection of Amplified HIV-1 RNA," PLoS ONE 7(9):e14511, 2012, 8 pages.
Han, K.N., et al., "Three-Dimensional Paper-Based Slip Device for One-Step Point-of-Care Testing," Scientific Reports 6:25710, 2016, 7 pages.
Mu, X., et al., "Multiplex Microfluidic Paper-Based Immunoassay for the Diagnosis of Hepatitis C Virus Infection," Analytical Chemistry 86(11):5338-5344, 2014.
He, M., and Z. Liu, "Paper-Based Microfluidic Device With Upconversion Fluorescence Assay," Analytical Chemistry 85(24):11691-11694, 2013.
Pal, R., et al., "An Integrated Microfluidic Device for Influenza and Other Genetic Analyses," Lab on a Chip 5:1024-1032, 2005.

\* cited by examiner

TEMPERATURE-ACTUATED VALVE, FLUIDIC DEVICE, AND RELATED METHODS OF USE

CROSS-REFERENCE TO RELATED APPLICATION

This application claims benefit of Provisional Application No. 62/643,551, filed Mar. 15, 2018, the content of which is hereby incorporated by reference in its entirety.

STATEMENT OF GOVERNMENT LICENSE RIGHTS

This invention was made with government support under Grant No. HR0011-11-2-0007, awarded by the Defense Advanced Research Projects Agency. The government has certain rights in the invention

BACKGROUND

Lateral flow strip tests ("LFT" or "LFTs") have been identified as a diagnostic technology well-suited for point-of-care ("POC") use in limited-resource settings. With fluid transport occurring due to the capillary pressure of the strip material (rather than through the use of pumps), LFTs are generally disposable, rapid, user-friendly, and affordable. Numerous LFTs have been developed and successfully used in limited-resource settings, with applications including pregnancy testing and disease diagnosis. A basic function of an LFT is to mix a substance of interest (e.g., an analyte) with a visible label (e.g., antibodies conjugated to gold nanoparticles) and capture the analyte-label complex at a detection line via an immobilized capture molecule (e.g., antibody). While the simplicity of LFTs makes them suitable for use as a POC tool, such simplicity has generally limited their use to tests that can be carried out in a single chemical step. Moreover, the use of LFTs as a clinically relevant diagnostic tool can be limited to targets with high(er) concentrations because of limited analytical sensitivity of the LFT format.

Porous membranes are often used in conventional LFTs and flow-through cartridges. As such, flow of fluid through the LFT usually occurs by wicking through a membrane (either laterally or transversely) onto an absorbent pad. Immunoassays take advantage of such porous membrane systems to measure and analyze analyte samples. The dependence on wicking to generate flow may limit control over assay conditions. Specifically, lateral flow assays are often limited to a single step in which the sample (and buffer) is added to the sample pad, and the sample flows by capillary action (i.e., wicking) along the pad. Capillarity provides the force to provide a nearly continuous flow of fluid from one point to another, causing reagents stored in dry form to be transported along the device and to pass over regions that contain immobilized capture molecules. These devices are typically restricted to simple one-shot detection chemistries like colored nanoparticles that do not provide the sensitivity possible with multistep-detection chemistries, such as enzymatic amplification. They are also rarely quantitative.

Conventional microfluidic systems that include open fluid channels for the flow of buffers, samples, and reagents can inherently be made more sophisticated, and it is possible to use them to carry out a very large number of fluid-processing steps. Such microfluidic systems usually incorporate a complex disposable, which leads to unavoidably high per-test manufacturing costs and the need for expensive external pumps and valves to move fluids. While conventional microfluidic devices can inherently be very flexible in the functions that they perform, they are also inherently complicated and expensive. Additionally, the devices that have been made that support complex function are usually quite complex themselves.

Accordingly, there is presently a need for diagnostic assays having a compact form factor usable for complex, multi-step diagnostic assays suitable for use in limited-resource settings.

SUMMARY

Toward that end, in aspect, the present disclosure provides, a temperature-actuated valve, such as a temperature-actuated valve suitable for use in a capillarity-based fluidic detection device. In an embodiment, the temperature-actuated valve generally includes a heat-shrink film defining a perforation extending at least partially in a first direction along the heat-shrink film; and a leakage-mitigation feature configured to limit fluid flow through the perforation when the valve is in a closed configuration. In an embodiment, the temperature-actuated valve is configured to open when a portion of the heat-shrink film including the perforation is heated above a threshold temperature to contract the heat-shrink film along a second direction perpendicular to the first direction to define an aperture, in an open configuration, providing a fluid a path through the heat-shrink film.

In another aspect, the present disclosure provides device generally including a first porous membrane; a second porous membrane; a temperature-actuated valve separating the first porous membrane and the second porous membrane in a closed configuration, and fluidically coupling the first porous membrane and the second porous membrane in an open configuration; and a planar control layer in thermal communication with temperature-actuated valve, the planar control layer comprising: two contact pads being electrically conductive configured to conductively couple to an external power source; and a conductive trace conductively coupling the two contact pads.

In an aspect, the present disclosure provides a method of fluidically coupling two or more porous membranes. In an embodiment, the method generally includes heating a heat-shrink film defining a perforation and disposed between the two or more porous membranes to contract the heat-shrink film and to open the perforation to define an aperture providing a fluid pathway between the two or more porous membranes.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1B:
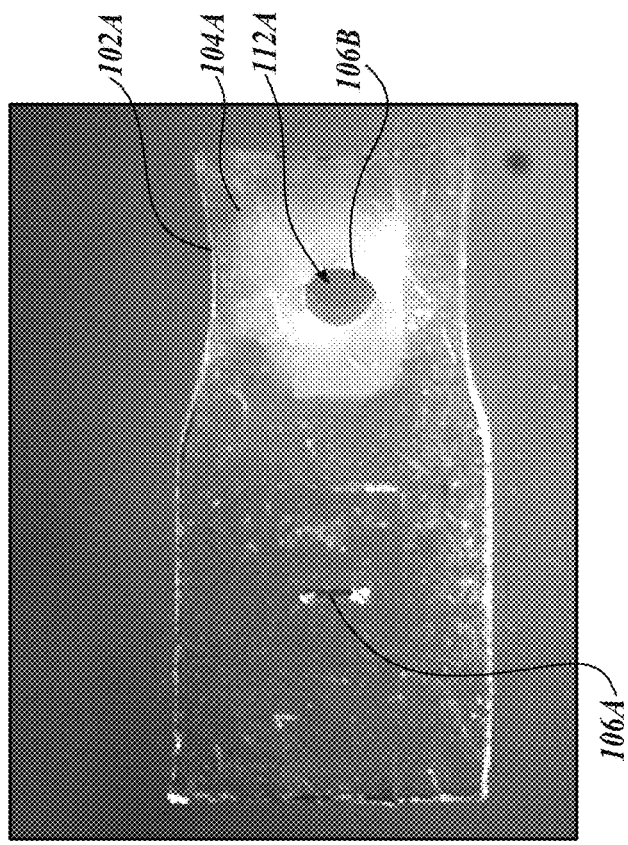
FIG. 1B is an image of the temperature-actuated valve of FIG. 1A with one of the perforations in a closed configuration and another perforation in an open configuration, in accordance with an embodiment of the disclosure.

The present disclosure provides examples of valves, devices, and methods for selectively delivering fluid, such as through heat activation. As set forth in greater detail below, such valves, devices, and methods are configured to selectively fluidically couple, for example, porous membranes through, for example, application of heat to a temperature-actuated valve.

Certain conventional capillarity-based systems include integrated power sources, such as batteries. In this regard, such conventional capillarity-based systems may not be disposable, such as by burning to ash. Further, such conventional capillarity-based systems are generally non-planar taking up a relatively large volume due to the integrated power sources and connections between the integrated power sources and powered components of the conventional capillarity-based systems.

In certain environments and use cases, it would be advantageous to have an analytic device suitable for performing chemical analyses that was also disposable, such as by burning to ash. Likewise, it would be advantageous to have an analytic device having a low-volume form factor suitable for operative coupling to a separate power source. Toward, this end the present disclosure provides temperature-actuated valves suitable for incorporation with a planar fluidics component and devices including a planar control layer and a planar fluidics component thermally coupled to the planar control layer. As discussed further herein, such a planar control layer can include a planar printed circuit board (PCB) including one or more heaters configured to heat the generally planar temperature-actuated valves.

Valves

In an aspect, the present disclosure provides temperature-actuated valve. As discussed further herein with respect to the devices of the present disclosure, such temperature-actuated valves may be suitable for fluidically separating a first porous membrane and the second porous membrane when the temperature-actuated valve is in a closed configuration, and fluidically coupling the first porous membrane and the second porous membrane when the temperature-actuated valve is in an open configuration. As used herein, a "temperature-actuated valve" refers to a valve configured to transition from a closed configuration to an open configuration when one or more portions of the valve are heated above a threshold temperature and to remain closed when below the threshold temperature. Generally, in a closed configuration, the temperature-actuated valve is configured to prevent fluid flow therethrough, whereas in an open configuration the temperature-actuated valve is configured to define a fluid path suitable to allow fluid flow therethrough.

In an embodiment, the temperature-actuated valve includes a heat-shrink material defining a perforation extending at least partially in a first direction along the heat-shrink material. As used herein, "heat-shrink material" or "heat-shrink film" refer to material or films, respectively, configured to contract when exposed to heat, such as when the heat-shrink material/film is heated above a threshold temperature.

In an embodiment, the temperature-actuated valve includes heat-shrink material in the form of a heat-shrink film. In this regard, such a heat-shrink film, defining a relatively thin sheet having two opposing major surfaces, is suitable for integration into a substantially planar fluidics component, such as a substantially planar fluidics component configured to thermally couple with a planar control layer. In an embodiment, the heat-shrink film is configured to contract along one or more directions orthogonal to the two major surfaces of the heat-shrink film.

The heat-shrink material can be any material configured to contract when heated above a threshold temperature. In an embodiment, the heat-shrink material is selected from the group consisting of fluorinated ethylene propylenes, polyolefins, polyvinyl chloride, polyvinylidene fluoride, silicone rubber, polytetrafluoro ethylene, Viton®, and combinations thereof. In an embodiment, the heat-shrink material is a uniaxial heat-shrink material configured to contract along a single direction of the heat-shrink material. In an embodiment, the heat-shrink material is a biaxial heat-shrink material configured to contract along two directions of the heat-shrink material.

As above, in an embodiment, the heat-shrink material defines a perforation. In that regard, attention is direction to FIGS. 1A and 1B, in which a temperature-actuated valve 102A, in accordance with an embodiment of the disclosure, is shown. As shown, the temperature-actuated valve 102A defines perforations 106A and 106B extending along a first direction 108. In FIG. 1A, the temperature-actuated valve 102A is disposed in a closed configuration, such as prior to contraction of the heat-shrink material. In this regard, the perforations 106A and 106B are in the form of slits, such as slits cut into the heat-shrink material. In an embodiment, the slits are configured to be liquid- and/or vapor-tight in the closed configuration. In that regard, the temperature-actuated valve 102A is configured to contain liquids and gases to one side of the perforations 106A and 106B.

Figure 1A:
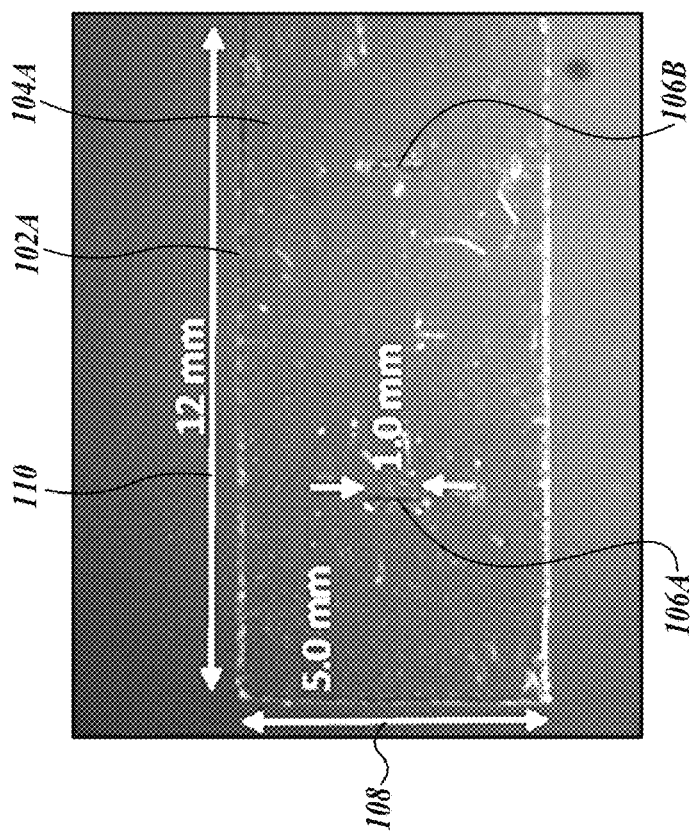
FIG. 1A is an image of a temperature-actuated valve with two perforations in closed configurations, in accordance with an embodiment of the disclosure.

FIG. 1B is an image of the temperature-actuated valve 102A of FIG. 1A in which perforation 106B is an open configuration and perforation 106A is in a closed configuration. As a portion of the heath-shrink material including perforation 106B contracts along a second direction 110 perpendicular to the first direction 108, such as due to heating the heat-shrink film 104A, the perforation 106B opens to define an aperture 112A. As discussed further herein, such an aperture 112A can define a fluid path through the temperature-actuated valve 102A, such as between a first porous membrane in fluidic contact with the aperture 112A and disposed on a first major side of the heat-shrink film 104A and a second porous membrane in fluidic communication with the aperture 112A and disposed on a second major side of the heat-shrink film 104A opposite the first major side.

As above, in an embodiment, the heat-shrink material is a uniaxial heat-shrink material configured to contract along a single direction. In an embodiment, the perforations 106A and 106B extend at least partially in a direction perpendicular to the direction of contraction 110 of the heat-shrink material along the first direction 108. In an embodiment, the heat-shrink material is mechanically constrained, such as by pinning or otherwise attaching the heat-shrink material to a substrate that does not substantially alter shape during heating. By mechanically constraining the heat-shrink material, stress relief in the heat-shrink material is limited. In this regard, as the uniaxial heat-shrink material contracts along the single direction, the perforation 106B opens to define the aperture 112A.

In an embodiment, the temperature-actuated valves described herein include one or more leakage-mitigation features configured to limit or prevent fluid flow through the perforation when the valve is in a closed configuration. In that regard, attention is directed to FIGS. 1C and 1D in which a temperature-actuated valve 102B, in accordance with an embodiment of the disclosure, is illustrated. In the illustrated embodiment, the temperature-actuated valve 102B is shown to include a number of perforations 106C-106E defined by heat-shrink film 104B and extending along a first direction 108. As shown each perforation 106C-106E includes a leakage-mitigation feature 114A-114C, respectively. In an embodiment, the leakage-mitigation features 114A-114C are configured to limit or prevent fluid flow through the perforations 106C-106E, respectively, when the temperature-actuated valve 102B is in a closed configuration.

Figure 1C:
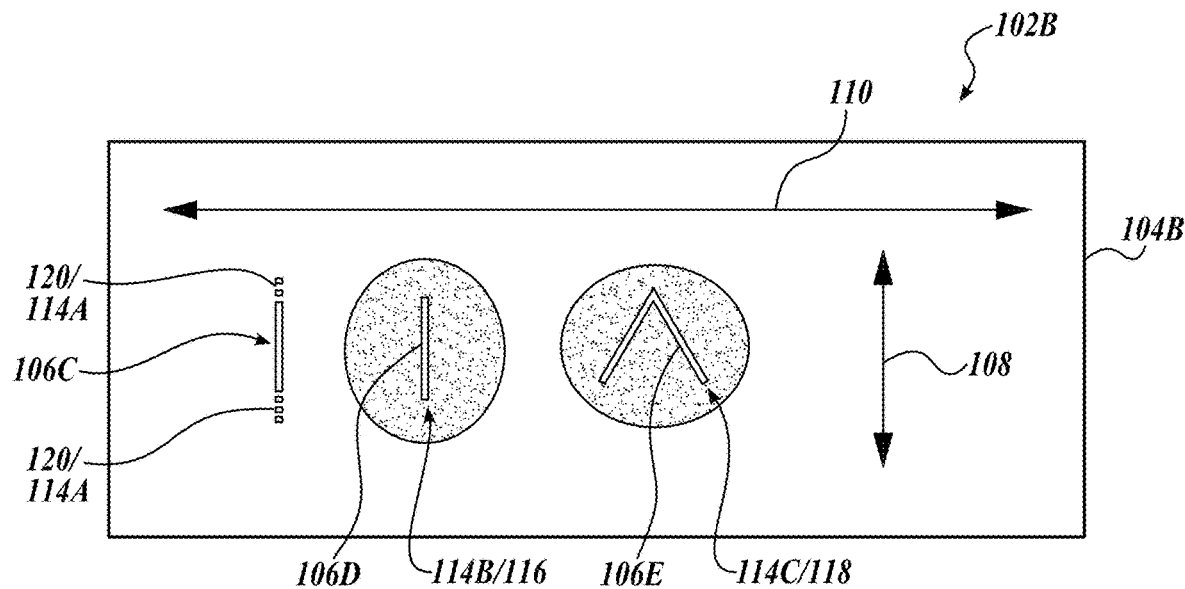
FIG. 1C is an illustration of a temperature-actuated valve, in accordance with an embodiment of the disclosure, shown in a closed configuration.
Figure 1D:
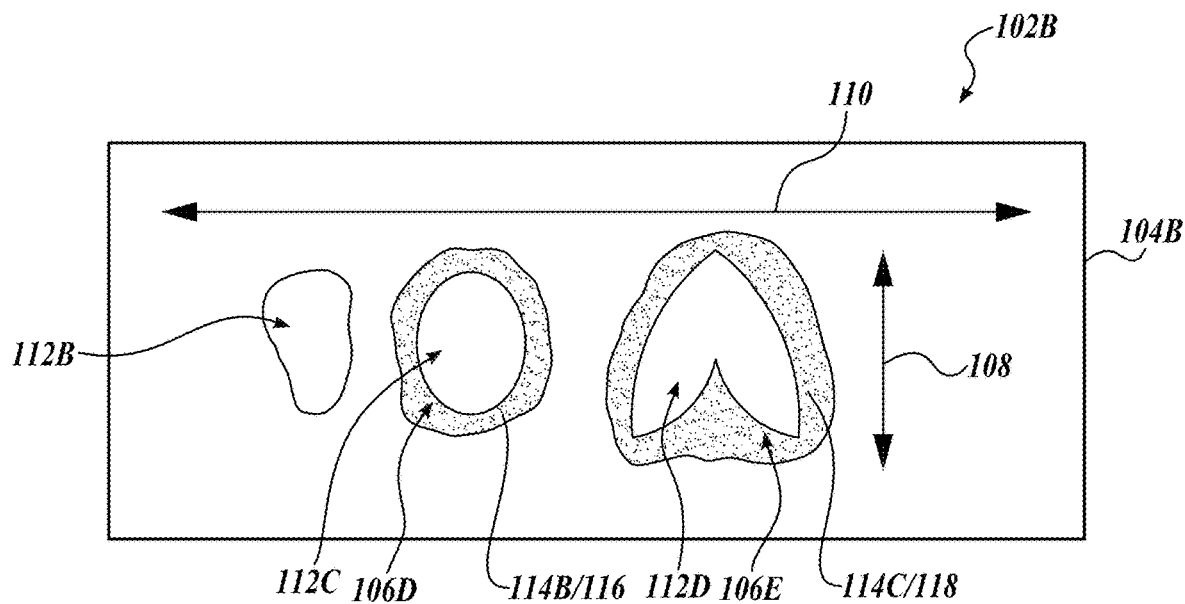
FIG. 1D is an illustration of the temperature-actuated valve of FIG. 1C shown in an open configuration, in accordance with an embodiment of the disclosure.

In an embodiment, the leakage-mitigation feature includes a thermoplastic polymer disposed on a portion of the heat-shrink film 104B including the perforations. Referring still to FIGS. 1C and 1D, a portion of the temperature-actuated valve 102B including the perforation 106D is shown to include a leakage-mitigation feature 114B including a thermoplastic polymer 116 disposed over the perforation 106D. In an embodiment, the thermoplastic polymer 116 is disposed over the perforation 106D to limit or prevent fluid flow therethrough. In an embodiment, the thermoplastic polymer 116 softens as the temperature-actuated valve 102B is heated to or above the threshold temperature. In this regard, as the thermoplastic polymer 116 softens it is no longer structurally capable of maintaining a liquid- and/or gas-tight seal over the perforation 106D.

Figure 2:
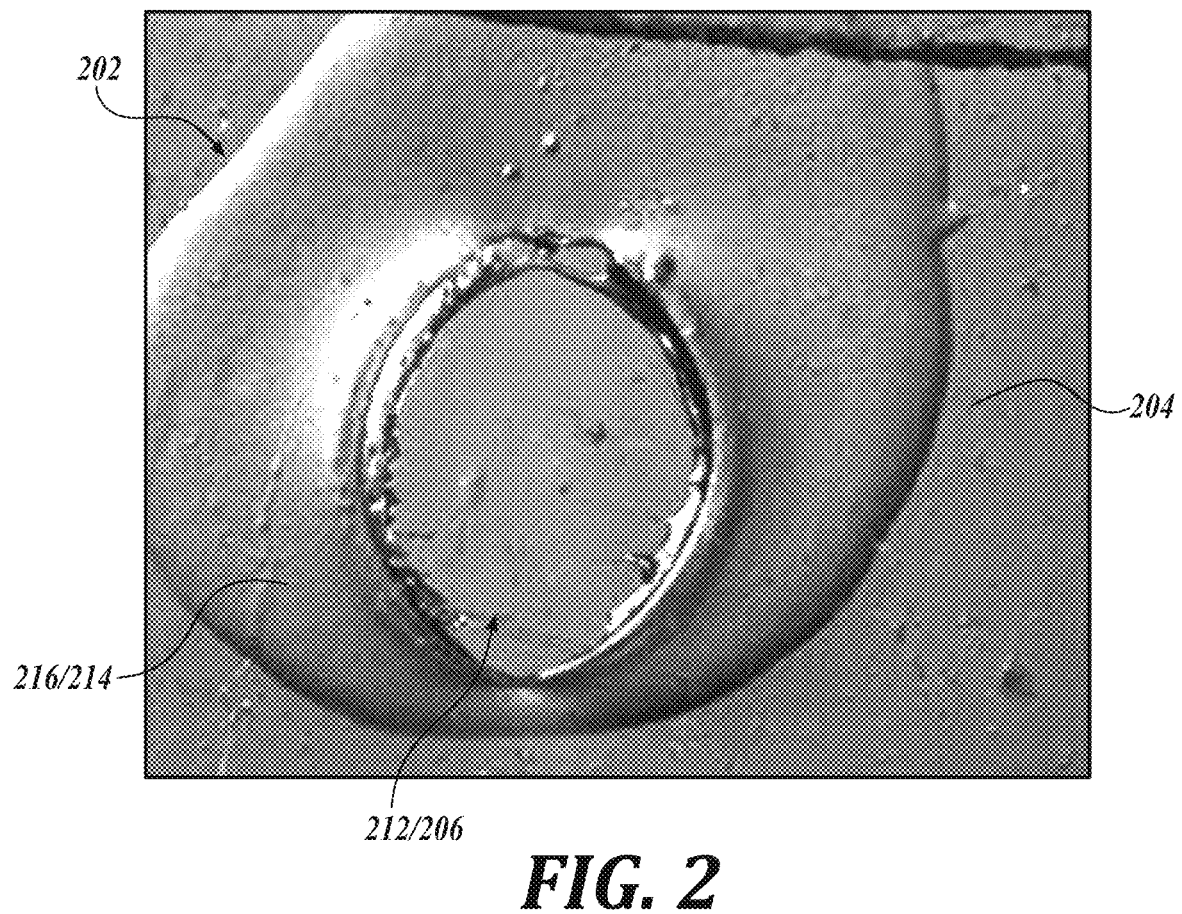
FIG. 2 is an image of a temperature-actuated valve including a leakage-mitigation feature, in accordance with an embodiment of the disclosure.

FIG. 2 is an image of a temperature-actuated valve 202, in accordance with an embodiment of the disclosure, shown in an open configuration. The temperature-actuated valve 202 includes a heat-shrink film 204 defining a perforation 206 and a leakage-mitigation feature 214 including a thermoplastic polymer 216, here polycaprolactone, coating a portion of the heat-shrink film 204 including the perforation 206. As shown, when actuated through heating above the threshold temperature, the thermoplastic polymer 216 melts and the heat-shrink film 204 contracts to define an aperture 212.

In an embodiment, the thermoplastic polymer 216 has a melting temperature less than or equal to the threshold temperature of the heat-shrink film 204. In an embodiment, the thermoplastic polymer 216 has a glass transition temperature less than or equal to the threshold temperature. In an embodiment, the thermoplastic polymer 216 is selected from the group consisting of polycaprolactone, polyethylene copolymers, and combinations thereof. In an embodiment, the thermoplastic polymer 216 is polycaprolactone.

In an embodiment, the leakage-mitigation feature comprises a hydrophobic layer disposed on a portion of the heat-shrink film adjacent to and/or including the perforation. As shown in FIG. 1C, a portion of the temperature-actuated valve 102B including the perforation 106E includes a leakage-mitigation feature 114C including a hydrophobic layer 118 disposed over perforation 106E. Such a hydrophobic layer 118 may be suitable to prevent or limit fluid flow, such as an aqueous solution or suspension, through the perforation 106E when the temperature-actuated valve 102B is in a closed configuration due to an increased contact angle between the temperature-actuated valve 102B and a fluid in contact with the valve. In this regard, the hydrophobic layer 118 is configured to reduce the capillary pressure for flowing fluid through the perforation 106E.

While perforations defining slits in heat-shrink materials are discussed herein, it will be understood that other shapes are possible. Still referring to FIG. 1C, perforation 106E is shown to define a chevron in the heat-shrink material 104B. As shown, as the heat-shrink film 104B contracts along a second direction 110 perpendicular to the first direction 108, the chevron-shaped perforation 106E opens to define an aperture 112D.

In an embodiment, the hydrophobic layer 118 includes a hydrophobic ink deposited on the portion of the heat-shrink film 104B adjacent to and/or including the perforation 106E. Such a hydrophobic ink may be deposited by, for example, contacting the heat-shrink film 104B with a pen or other deposition device carrying the hydrophobic ink. In an embodiment, the leakage-mitigation feature includes a hydrophobic phase-change material disposed on the portion of the heat-shrink film 104B adjacent to and/or including the perforation 106E. In an embodiment, the hydrophobic phase-change material includes a wax configured to change from a solid phase to a liquid phase at a temperature less than or equal to the threshold temperature. As the phase-change material changes phase it generally liquefies and/or softens. In this regard, the leakage-mitigation feature moves away from a perforation and/or loses its structural stability making fluid flow through the temperature-actuated valve easier and more likely.

In an embodiment, the leakage-mitigation feature includes scoring of the heat-shrink film 104B. In that regard, attention is directed to FIGS. 1C and 1D in which a portion of the temperature-actuated valve 102B including perforation 106C is shown to further include the leakage-mitigation feature 114A including scoring 120 (shown as dashed lines), in accordance with an embodiment of the disclosure. Such scoring 120 can include cuts, deformations, thinning, and the like of the heat-shrink material 104B. In an embodiment, the scoring 120 may be defined by a portion of the heat-shrink material 104B that is thinner than surrounding portions. As the heat-shrink material 104B contracts, such as due to heating above the threshold temperature of the heat-shrink material 104B, the portion of the heat-shrink material 104B that defines the scoring 120 is stressed to the point of tearing. In this regard, the scoring 120 may be liquid- and/or gas-tight in a closed configuration, but tears under stress to define an aperture 112B defining a fluid pathway through the heat-shrink material 104B.

In an embodiment, the scoring 120 is formed through a technique selected from the group consisting of pressing the heat-shrink material 104B, cutting the heat-shrink material 104B, ablating the heat-shrink material 104B, and combinations thereof. It will be understood that scoring 120 includes a thinned portion of the heat-shrink material 104B that does not fully puncture the heat-shrink material 104B.

In an embodiment, the heat-shrink film 104B defines both a perforation 106C and scoring 120, such as scoring 120 adjacent to the perforation 106C, as shown in FIGS. 1C and 1D. In an embodiment, the heat-shrink film 104B defines scoring 120 and does not define a perforation which fully penetrates the heat-shrink film 104B.

In an embodiment, the heat-shrink film 104B defines two or more perforations 106C-106E, such as two or more perforations 106C-106E disposed in physically separate portions of the heat-shrink film 104B extending at least partially along the first direction 108 configured to define apertures 112B-112D, in an open configuration. In an open configuration, the apertures 112B-112D provide a first and second fluid path when the heat-shrink film 104B is heated above the threshold temperature. In this regard, the heat-shrink film 104B is configured to allow fluid to flow through two more portions of the heat-shrink film 104B. Such a heat-shrink film 104B is suitable, for example, to selectively allow fluid flow through multiple portions of a fluidics component of a device.

In an embodiment, portions of the heat-shrink film are preheated, such as before integrating them into the heat-shrink valves of the present disclosure. In this regard, such preheated portions have contracted in response to heating to a particular temperature and do not contract substantially more in response to heating at or below such a temperature. Accordingly, a preheated portion of the heat-shrink film 104B including a perforation is configured to remain in a closed configuration when heated to temperatures at or below a preheating temperature.

In an embodiment, different portions of the heat-shrink film 104B are preheated to different temperatures. In this regard, such different portions that have been preheated to different temperatures and including perforations 106C-106E are configured to transition to an open configuration at different temperatures. As discussed further herein with respect to the devices of the present disclosure, it may be advantageous to have different perforations 106C-106E transition to open positions at different threshold temperatures according to differing reaction temperatures.

Devices

In another aspect, the present disclosure provides a device including porous membranes fluidically separated by a temperature-actuated valve. In an embodiment, the device includes a first porous membrane; a second porous membrane; and a temperature-actuated valve separating the first porous membrane and the second porous membrane in a closed configuration, and fluidically coupling the first porous membrane and the second porous membrane in an open configuration.

As used herein, "porous element" or "porous membrane" refers to a porous membrane (e.g., a wick, pathway, leg, pad, delivery channel, etc.) through which fluid can travel by capillary action, such as paper, nitrocellulose, nylon, glass fiber, and the like. Unless the context clearly requires otherwise, a porous element can be two-dimensional or three-dimensional (when considering its height in addition to its length and width). Additionally, a porous membrane can be a single layer or may comprise two or more membranous layers. Although in some embodiments a specific term may be used (e.g., "wick," "pathway," "leg," "pad," "delivery channel," etc.), it should be understood that use of a different porous element is also within the scope of the present technology.

Figure 4A:
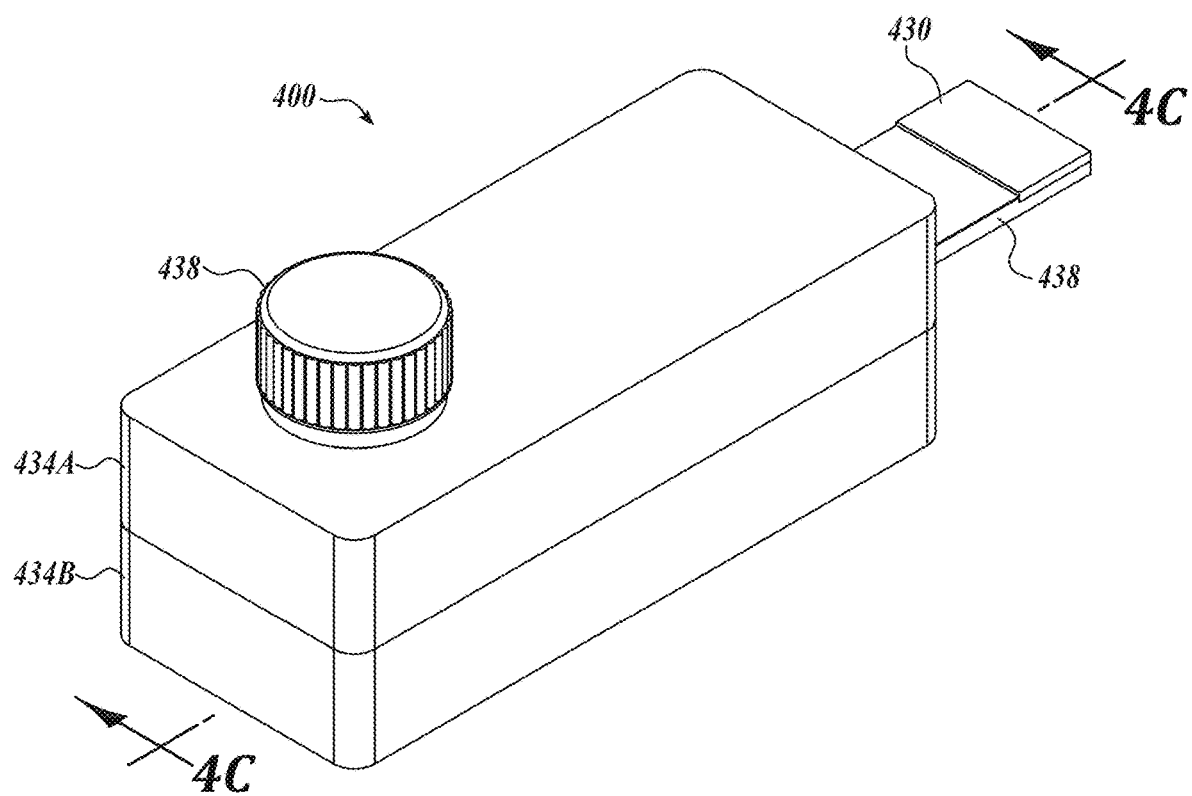
FIG. 4A is a perspective view of a device, in accordance with an embodiment of the disclosure.
Figure 4B:
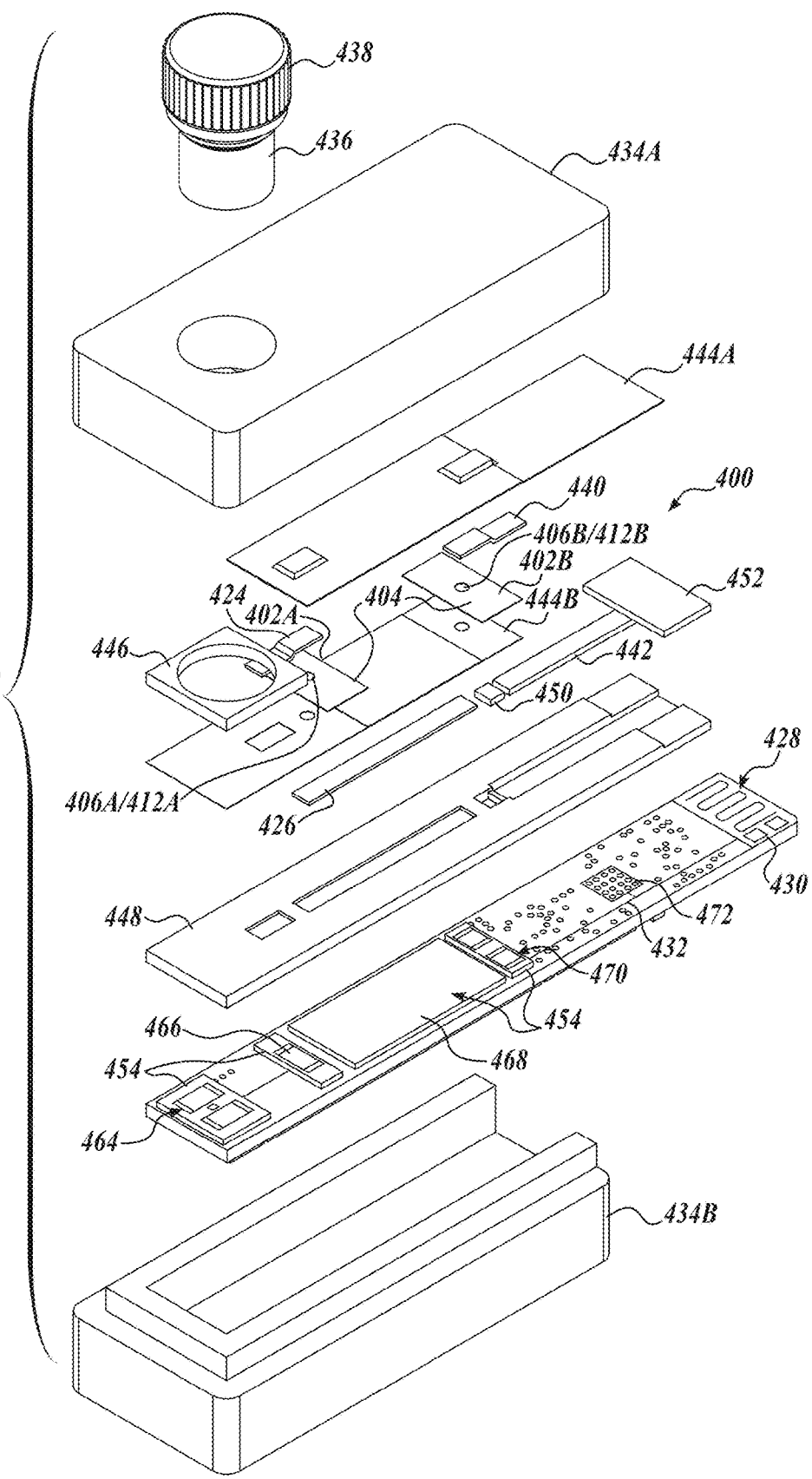
FIG. 4B is an exploded perspective view of the device of FIG. 4A.
Figure 4C:
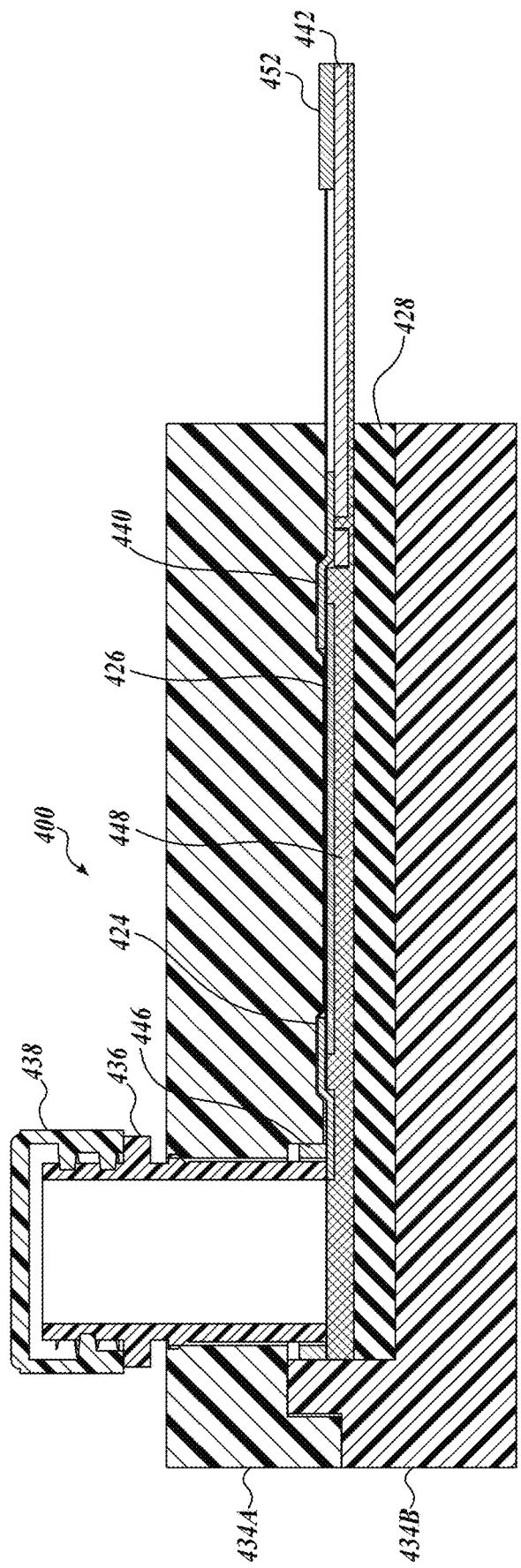
FIG. 4C is a cross-section view of the device of FIG. 4A.

In an embodiment, the device further includes a planar control layer in thermal communication with temperature-actuated valve. In that regard, attention is directed to FIGS. 4A-4C in which a device 400, in accordance with an embodiment of the disclosure, is illustrated. FIG. 4A is a perspective view of device 400. FIG. 4B is an exploded perspective of the device 400. FIG. 4C is a cross-section view of the device 400.

As shown, the device 400 includes a first porous membrane 424; a second porous membrane 426; a temperature-actuated valve 402A fluidically separating the first porous membrane and the second porous membrane in a closed configuration. The device 400 is shown to further include a planar control layer 428 in thermal communication with temperature-actuated valve 402A. As discussed in further detail below, the planar control layer 428 is configured to electrically couple to an external power source, such as through contact pads 430 (shown here configured to couple with a USB socket), for powering various components of the planar control layer 428 and heating other components of the temperature-actuated valve 402A. The planar control layer 428 is shown to further include a conductive trace 432 conductively coupling the contact pads 430 to complete an electrical circuit including the contact pads 430 and other electrical components of the planar control layer 428.

The device 400 is shown to further include a sample chamber 436 configured to receive a biological sample. In an embodiment, the sample chamber 436 further includes lysis reagents, such as lysis reagents configured to lyse cells of a biological sample. As discussed further herein with FIGS. 3A-3C, the sample chamber 436 may be configured to receive a sample delivery instrument, such as a swab configured to carry a biological sample. In the illustrated embodiment, the device 400 is shown to further include a screw cap 438 shaped to cooperatively couple to the sample chamber 436, such as to reduce contamination of the biological sample.

In the illustrated embodiment, the device 400 further includes an enclosure top 434A and bottom 434B configured to carry device 400 components and position them relative to one another in a configuration suitable to perform the assays described herein. As shown, the enclosure top 434A and bottom 434B are shown to enclose fluidic components of the device 400 including valves, porous membranes, and the planar control layer 428. In this regard, the enclosure top 434A and bottom 434 are configured to carry the device 400 components and position them relative to one another suitable for performing lysis, amplification, and detection reactions. In an embodiment, the enclosure top 434A and bottom 434B are configured to thermally insulate the sample chamber 436 and a biological sample carried by the sample chamber 436, such as to facilitate a lysis reaction therein.

As shown, the enclosure top 434A and bottom 434B configured to receive the sample chamber 436 in conjunction with the collar 446. When assembled, the sample chamber 436 is configured to be in fluidic contact with an upstream portion of lysis transport porous membrane 424, which is disposed between seals 444A and 444B, and further carried by tray 448. As used herein, an "upstream portion" refers to a portion of a device of component thereof closer to a fluidic point of entry as fluid travels through the device or component thereof than another portion. In an embodiment, when carried by the enclosure top 434A and bottom 434B, seals 444A and 444B and tray 448 are configured to retain fluid in fluidic pathways, such as those defined by the various porous membranes of device 400.

In the illustrated embodiment, lysis transport porous membrane 424 is in fluidic contact with temperature-actuated valve 402A at a downstream portion of the lysis transport porous membrane 424 opposite the upstream portion. As user herein, a "downstream portion" refers to a portion of a device or component thereof that is farther from a fluidic point of entry as fluid travels through the device or component thereof than another portion. In this regard, lysed components of the biological sample are configured to wick through the lysis transport porous membrane 424. In a closed configuration, the temperature-actuated valve 402A is configured to retain lysed components of a biological sample within the lysis transport porous membrane 424, such as during a lysis reaction. Correspondingly, in an open configuration, the temperature-actuated valve 402A provides a fluid pathway through the temperature-actuated valve 402A to place the lysis transport porous membrane 424 in fluidic contact with another porous membrane 426, shown here as an amplification porous membrane 426.

As above, the planar control layer 428 is configured to be in thermal contact with fluidic components of the device 400, such as when received and enclosed by the enclosure top 434A and bottom 434B. In an embodiment, the planar control layer 428 is generally planar having two major opposing sides configured to contact a correspondingly planar portion of fluidic components of the devices described herein.

In this regard, the planar control layer 428, particularly heaters 464, 466, 468, and 470 of the planar control layer 428, are configured to transfer heat from the planar control layer 428 to such fluidic components. As shown, the planar control layer 428 includes a number of heaters, including a lysis heater 464 positioned to heat contents of the sample chamber 436, such as during a lysis reaction. The planar control layer 428 is further shown to include a lysis valve heater 466 positioned to heat the temperature-actuated valve 402A, such as to place the temperature-actuated valve 402A in an open configuration. In an embodiment, the lysis valve heater 466 includes a conductive trace 432 configured to resistively heat the temperature-actuated valve 402A suitable to transition the temperature-actuated valve 402A to an open configuration.

While heaters including conductive traces configured to resistively heat are described, it will be understood that other heater configurations are possible. In an embodiment, the heaters of the present disclosure include a positive-temperature-coefficient (PTC) heater in conductive communication with the contact pads 430 and the conductive trace 432. In an embodiment, such a PTC heater includes a PTC ink configured to increase its electrical resistance at a predetermined temperature. In this regard, it may be suitable for heating portions of a porous membrane in thermal contact therewith to a predetermined temperature, such as for an isothermal nucleic acid amplification reaction.

The planar control layer 428 is shown to further include a controller 472. Such a controller 472 may be operatively coupled to various electronic components, such as heaters 464, 466, 468, and 470, to choreograph their operation. Here, the controller 472 can include logic that when executed by the controller 472 causes the apparatus to perform operations, such as sequentially heating the lysis heater 464 suitable to perform a lysis reaction and heating the lysis valve heater 466 to place the temperature-actuated valve 402A in an open configuration.

As above, the controller 472 is shown coupled to various components of the planar control layer 428 to choreograph their operation. Controller 472 may include software/firmware logic executing on a microcontroller, hardware logic (e.g., application specific integrated circuit, field programmable gate array, etc.), or a combination of software and hardware logic. Although FIG. 4B illustrates controller 472 as a distinct functional element, the logical functions performed by controller 472 may be decentralized across a number hardware elements. In an embodiment, portions or all of the controller 472 may be disposed off of the planar control layer 428, such as in a distributed computing system. Controller 472 may further include input/output (I/O ports), communication systems, or otherwise.

In an embodiment, temperature-actuated valve 402A includes a heat-shrink material 404, as discussed further herein with respect to FIGS. 1A-1D and 2. Accordingly, in an embodiment, the temperature-actuated valve 402A includes a heat-shrink film 404 defining a perforation 406A and, in a closed configuration, extending at least partially in a first direction. In this regard, the heat-shrink film 404 is configured to contract along a second direction perpendicular to the first direction when the heat-shrink film 404 is heated above a threshold temperature, such as when heated by the lysis valve heater 466, to define, in the open configuration, an aperture 412A providing a fluid a path between the lysis transport porous membrane 424 and the amplification porous membrane 426.

In an embodiment, the lysis valve heater 466 is configured to heat the temperature-actuated valve 402A above a lysis reaction temperature, such as in response to input from the controller 472. In an embodiment, the temperature-actuated valve 402A is configured to open, such as by contracting a heat-shrink film 404 of the temperature-actuated valve 402A, at a temperature greater than a lysis reaction temperature. In this regard, the temperature-actuated valve 402A is configured to remain in a closed configuration during a lysis reaction such that, for example, the biological sample and lysis reagents are retained within the sample chamber 436. Further, in an embodiment, the lysed biological sample is placed in fluidic communication with the amplification porous membrane 426 only after the temperature-actuated valve 402A is heated above the lysis reaction temperature.

In an embodiment, the lysis heater 464 is configured to heat the sample chamber 436 to a lysis reaction temperature above a valve-opening temperature. In such an embodiment, the sample chamber 436 and temperature-actuated valve 402A are disposed in physically separate portions of the device 400 such that the temperature-actuated valve 402A is not placed in an open configuration due to heating from the lysis heater 464 above the threshold temperature.

In the illustrated embodiment, the device 400 includes an amplification porous membrane 426 positioned downstream of and in fluid communication with the lysis transport porous membrane 424 when the temperature-actuated valve 402A is in an open configuration. In this regard, the amplification porous membrane 426 is configured to receive fluid from the lysis transport porous membrane 424 including, for example, fluids containing lysed components of a biological sample.

In an embodiment, the amplification porous membrane 426 includes one or more reagents suitable to amplify nucleic acid of a sample disposed in the amplification pad. In an embodiment, the nucleic acid amplification reagents include reagents suitable to perform an isothermal nucleic acid amplification reaction. In an embodiment, the amplification porous membrane 426 includes one or more dry (or wet) amplification reagents, such as nicking enzymes, polymerases, probes, primers, and other components utilized in isothermal amplification reactions.

When carried by the enclosure top 434A and bottom 434B and the tray 448, the device 400 is configured to position the amplification porous membrane 426 in thermal contact with an amplification heater 468, shown here operatively coupled to controller 472. As shown, the amplification heater 468 includes a block of thermal epoxy 454 to distribute heat transferred to the amplification porous membrane 426. As discussed further herein with respect to FIG. 3A, the amplification heater 468 can include a conductive trace 432, such as a serpentine conductive trace 432, configured to resistively heat the amplification porous membrane 426 suitable to perform a nucleic acid amplification reaction in the amplification porous membrane 426.

In the illustrated embodiment, the device 400 includes a second temperature-actuated valve 402B and an amplicon transport porous membrane 440. As shown, the temperature-actuated valve 402B is disposed between the amplification porous membrane 426 and the amplicon transport porous membrane 440. In this regard, the second temperature-actuated valve 402B fluidically separates the amplification porous membrane 426 and the amplicon transport porous membrane 440 in a closed configuration. Correspondingly, the second temperature-actuated valve 402B fluidically couples the amplification porous membrane 426 and the amplicon transport porous membrane 440 in an open configuration. In an embodiment, the temperature-actuated valve 402B is an example of the temperature-actuated valves 102A, 102B, and/or 202 discussed further herein with respect to FIGS. 1A-1C and 2, respectively.

In an embodiment, the temperature-actuated valve 402B is configured to transition from a closed configuration to an open configuration, such as when heated by amplification valve heater 470, to a temperature greater than a nucleic acid amplification reaction temperature. In that regard, as the amplification heater 468 applies heat to the amplification porous membrane 426, the temperature-actuated valve 402B remains in a closed configuration. Accordingly, amplification reactants, such as analytes in the biological sample, primers, enzymes, and the like, are retained together in the amplification porous membrane 426 during the amplification reaction, thus enhancing an amplification reaction efficiency.

As shown, the device 400 further includes a salt pad 450 and a detection porous membrane 442 positioned downstream of and in fluid communication with the amplification porous membrane 426. In this regard, the detection porous membrane 442 is positioned to receive fluids from the amplification porous membrane 426. In an embodiment, the detection porous membrane 442 includes a plurality of capture molecules configured to selectively couple to an analyte, such as an analyte disposed in the biological sample or an amplified or otherwise transformed component thereof.

In an embodiment, the salt pad 450 includes one or more reagents, such as one or more salts, suitable to facilitate and/or enhance a detection reaction in the detection porous membrane 442. As above, the salt pad 450 is in fluid communication with the amplification porous membrane 426. In this regard, the salt pad 450 is configured to introduce the one or more reagents disposed therein into fluid flows directed to the detection porous membrane 442 for detection.

As above, in the illustrated embodiment, the salt pad 450 and the detection porous membrane 442 are positioned to receive liquid from the amplification porous membrane 426 when the temperature-actuated valve 402B is in an open position. In this regard, analytes including, for example, amplified nucleic acid molecules received from the amplification porous membrane 426 may be selectively coupled to the plurality of capture molecules on the detection porous membrane 442.

In an embodiment, the detection porous membrane 442 includes reagents suitable for visualizing analytes selectively bound to the detection porous membrane 442. In an embodiment, the reagents, such as metal nanoparticles coupled to a selective binder (e.g. an antibody), are configured for visualization with an eye, such as a human eye without further assistance. In an embodiment, the detection porous membrane 442 includes reagents suitable for visualizing analytes selectively bound to the detection porous membrane 442 in conjunction with other device 400 components, such as a fluorescent light source (not shown) such as where the reagents are configured to generate a fluorescent signal in response to irradiation by a fluorescent light source.

In an embodiment, the device 400 includes a detection component configured to generate a signal in response to an analyte selectively bound to a portion of the detection porous membrane 442. In an embodiment, the device 400 includes components configured to transmit that signal, such as to another computing device 400 separate from the device 400 and for receipt by a health care provider for analysis. As discussed further herein, such signals may be directed through the contact pads 430 or sent wirelessly.

The device 400 is further shown to include a waste pad 452 disposed in fluidic communication with a side of the detection porous membrane 442 opposite a side in contact with the salt pad 450 and at a downstream end of the fluid pathway of the device 400. The waste pad 452 is configured to absorb fluid that has passed through the detection porous membrane 442. In this regard, the waste pad 452 is configured to absorb fluid and analytes not immobilized by the plurality of capture molecules and to draw fluid through the fluid pathway of the device 400, such as through capillary action.

Figure 3A:
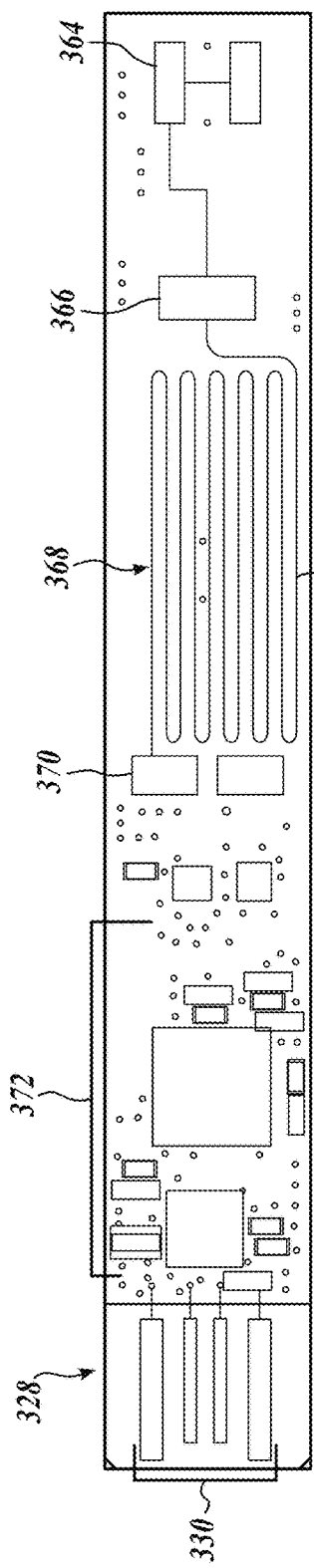
FIG. 3A is a top-down plan view of a planar control layer, in accordance with an embodiment of the disclosure.
Figure 3B:
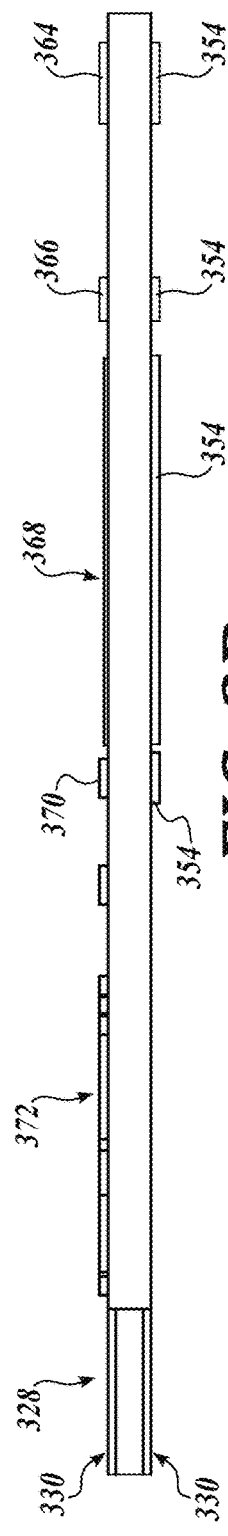
FIG. 3B is a side view of the planar control layer of FIG. 3A.
Figure 3C:
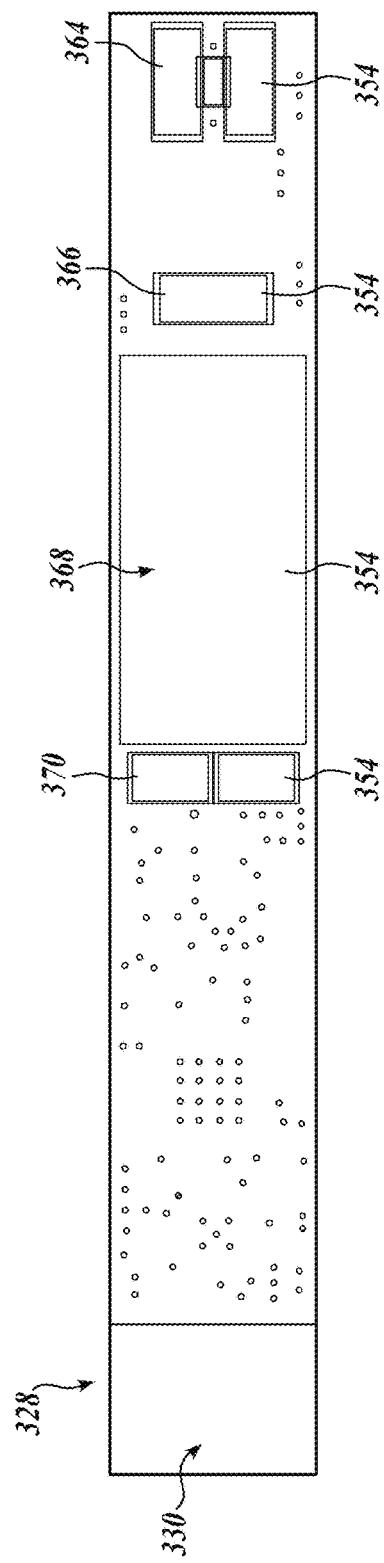
FIG. 3C is a bottom-up plan view of the planar control layer of FIG. 3A.

As above, the devices of the present disclosure include a planar control layer shaped to thermally couple with fluidic components of the device. An example of a planar control 300 layer, in accordance with an embodiment of the disclosure, is illustrated in FIGS. 3A-3C. As discussed further herein with FIGS. 4A-4C, the planar control layer 328 is generally planar having two major opposing sides configured to contact a correspondingly planar portion of fluidic components of the devices described herein. In this regard, the planar control layer 328, particularly heaters of the planar control layer 328, are configured to transfer heat from the planar control layer 328 to such fluidic components.

In the illustrated embodiment, the planar control layer 328 includes a plurality of heaters 364, 366, 368, and 370, and contact pads 330 conductively coupled to the plurality of heaters. As discussed further herein, the contact pads 330 are electrically conductive and configured to conductively couple to an external power source. As shown, the contact pads 330 are configured to conductively couple with a USB socket, such as to receive power therefrom and exchange signals. While contact pads 330 configured to conductively couple with a USB socket are illustrated, it will be understood that other configurations are possible.

In the illustrated embodiment, the planar control layer 328 includes a lysis heater 364, a lysis valve heater 366, an amplification heater 368, and an amplification valve heater 370. Such heaters 364, 366, 368, and 370 are positioned to provide heat to portions of fluidic components of the devices of the present disclosure corresponding to a sample chamber, such as sample chamber 436, a temperature-actuated valve, such as temperature-actuated valve 402A, disposed between the sample chamber and an amplification porous membrane, such as amplification porous membrane 426, and a temperature-actuated valve, such as temperature-actuated valve 402B, disposed between the amplification porous membrane and a detection porous membrane 442, respectively, as discussed further herein with respect to FIGS. 4A-4C.

In an embodiment, the heaters 364, 366, 368, and 370 include a conductive trace 332 configured to resistively heat portions of the fluidic components of the device. As shown, the amplification heater 368 includes a conductive trace 332 having a generally serpentine shape. Such a serpentine shape is suitable to heat the relatively large area of an amplification porous membrane, such as amplification porous membrane 426, to a relatively even and relatively constant temperature. In this regard, heater 368 is suitable to facilitate isothermal nucleic acid amplification reactions. In an embodiment, the amplification heater 368 includes a conductive trace 332 having a generally serpentine shape having a higher density of conductive trace 332 adjacent to an outer perimeter of the amplification heater 368. Heat generally dissipates more quickly at this outer perimeter and the higher density of conductive trace 332 is configured to provide greater heat generation suitable to provide a relatively even and constant temperature in the amplification porous membrane compensating for uneven heat dissipation at the outer perimeter.

The planar control layer 328 is further shown to include a thermally conductive layer 354, such as including a thermal epoxy 354, configured to conduct and distribute heat, such as heat received from the plurality of heaters 364, 366, 368, and 370. As shown, the thermally conductive layer 354 is disposed on a major side of the planar control layer 328 opposite the plurality of heaters 364, 366, 368, and 370. In this regard, the planar control layer 328 including thermally conductive layer 354 is configured conform with and to provide heat to the fluidics components on a portion having a generally planar shape. As discussed further herein, the fluidics components can include a generally planar side configured to couple with the planar control layer 328 to transfer heat therebetween. In this regard, one or more of the plurality of heaters 364, 366, 368, and 370 can include components that are proud of the rest of the planar control layer 328 without, for example, extending into fluidics components coupled to the planar control layer 328.

The planar control layer 328 is shown to further include a controller 372 operatively coupled to the plurality of heaters. As discussed further herein with respect to FIGS. 4A-4C, the controller 372 may be configured to choreograph the operation and sequence of the plurality of heaters, such as to sequentially heat the lysis heater 364 suitable to lyse a sample in a sample chamber, heat the lysis valve heater 366 to transition a lysis valve to open configuration to move a sample through the lysis valve to an amplification porous membrane, heat an amplification heater 368 suitable to perform an amplification reaction in an amplification porous membrane, and heat an amplification valve 402B to transition the amplification valve 402B to an open configuration. As also discussed further herein with respect to FIGS. 4A-4C, the planar control layer 328 may be configured to exchange signals with and receive instructions from another computing device operatively coupled to the planar control layer 328, such as through the contact pads 330. In this regard, certain instructions may be generated off of the planar control layer 328. Further, as above, the planar control layer 328 may be configured to send signals indicative of a detection event to other computing devices, such as by wirelessly sending such signals.

In an embodiment, the planar control layer 328 is configured to removably couple to fluidics components. In this regard, the planar control layer 328 is suitable to be coupled to fluidics components, such as for use in an amplification and/or detection assay, then uncoupled from the fluidics components and recoupled to other fluidics components for further assays. In an embodiment, the planar control layer 328 is individually available as a component separate from fluidics components coupleable to the planar control layer 328. In an embodiment, the planar control layer 328 is available along with two or more fluidics components each coupleable to the planar control layer 328.

Figure 3D:
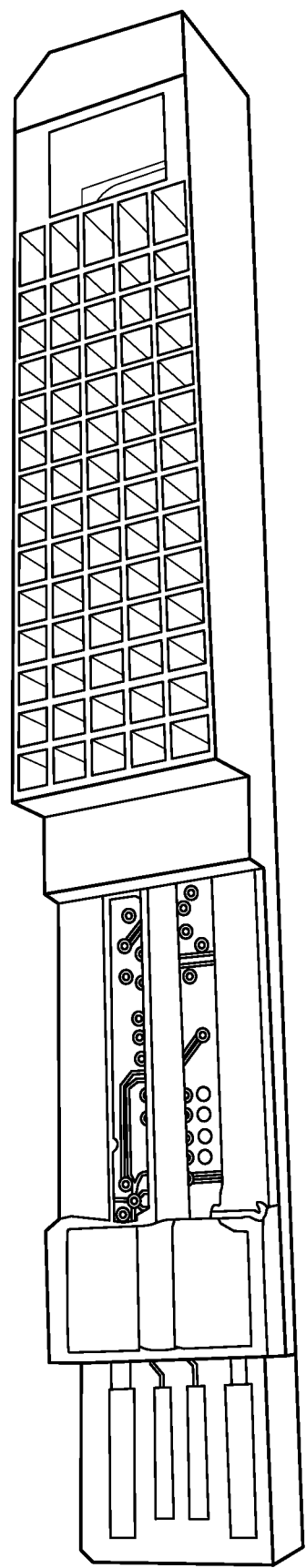
FIG. 3D is an image of a planar control layer, in accordance with an embodiment of the disclosure.

FIG. 3D is an image of a planar control layer, in accordance with an embodiment of the disclosure. In an embodiment, the planar control layer of FIG. 3D is an example of the planar control layer 328 of FIGS. 3A-3C. As shown, the planar control layer includes contact pads configured to conductive couple to an external power source, such as a USB socket. The planar control layer is further shown to include thermal insulation disposed on a major side opposite a major side configured to couple with fluidics components and configured to insulate the planar control layer, limiting heat flow away from the planar control layer and fluidics components coupled thereto.

Figure 5:
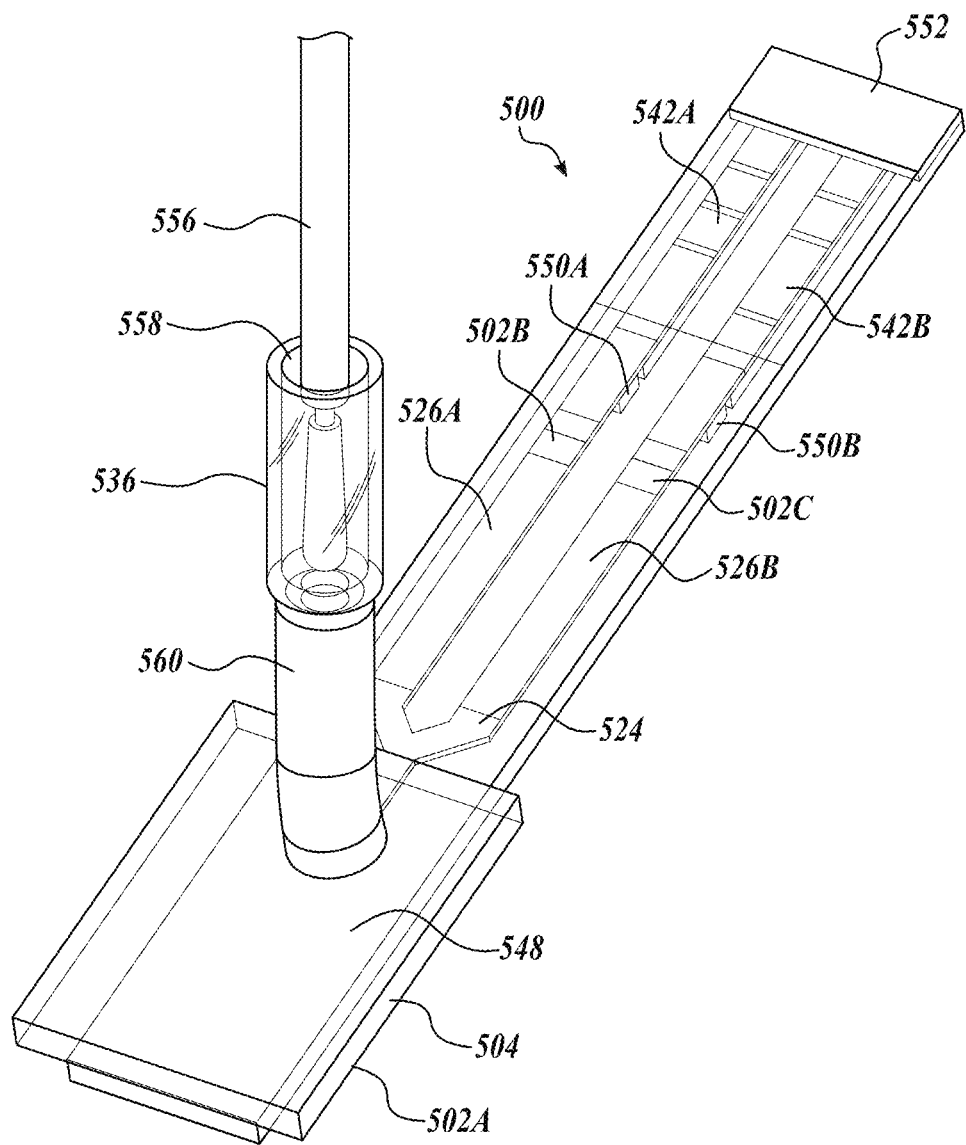
FIG. 5 is a perspective of fluidic components, in accordance with an embodiment of the disclosure.

FIG. 5 is an illustration of a perspective view of fluidics components 500, in accordance with an embodiment of the disclosure. In an embodiment, the fluidics components 500 are coupleable to a planar control layer as described further herein, such as planar control layer 328 of FIGS. 3A-3D. In an embodiment, the fluidics components 500 may be removably coupled to the planar control layer such that, for example, after an amplification and/or detection assay has been performed in the fluidics components 500 while coupled to a planar control layer, the fluidics components 500 may be uncoupled therefrom. In an embodiment, the fluidics components 500 are available individually and/or separate from a planar control layer.

In an embodiment, the fluidics components 500 are shaped to be received by an enclosure, such as enclosure top 434A and bottom 434B discussed further herein with respect to FIGS. 4A-4C, to place the fluidics components 500 in thermal communication with a planar control layer.

In the illustrated embodiment, the fluidics components 500 include sample chamber 536 configured to carry reagents reactive with a biological sample, such as lysis reagents configured to lyse cells in a biological sample. As shown, the sample chamber 536 is shaped to receive a swab 556 through the fluid introduction inlet 558, such as a swab 556 carrying a biological sample (e.g. mucus, sputum, saliva, and the like). The fluidics component further includes a lysis valve tubing 560 carried by tray 548 and in fluid communication a temperature-actuated valve 502A including heat-shrink film 504. In an embodiment, the temperature-actuated valve 502A is an example of a temperature-actuated valve as discussed further herein with respect to FIGS. 1A-1D and/or FIG. 2. As discussed further herein, the temperature-actuated valve 502A is configured to fluidically separate a first portion of the fluidics components 500, here the sample chamber 536 and a porous membrane 524, here a sample delivery porous membrane 524, in a closed configuration, and fluidically couple the sample chamber 536 and sample delivery porous membrane 524 in an open configuration. As also discussed further herein, the temperature-actuated valve 502A is configured to transition from a closed configuration to an open configuration when one or more portions of the temperature-actuated valve, such as including the heat-shrink film 504, are heated above a threshold temperature.

In an embodiment, the temperature-actuated valve 502A is positioned to receive heat from a heater of a planar control layer coupled to the fluidics components 500, such as the lysis valve heater 366 of the planar control layer 328 of FIGS. 3A-3C. In this regard, the temperature-actuated valve 502A is configured to receive heat from the lysis valve heater suitable to transition the valve from a closed configuration to an open configuration upon receipt of such heat from the planar control layer.

As above, the fluidics components 500 include a sample delivery porous membrane 524 in fluid communication with the sample chamber 536 when the temperature-actuated valve 502A is in an open configuration. The sample delivery porous membrane 524 defines a fluid path between the temperature-actuated valve 502A and one or more amplification porous membranes 526A and 526B. In the illustrated embodiment, the fluidics components 500 include two amplification porous membranes 526A and 526B defining fluid paths that bifurcate downstream of contact points with the sample delivery porous membrane 524. In an embodiment, the amplification porous membranes 526A and 526B include amplification reagents, such as dry or wet amplification reagents, disposed in the amplification porous membranes 526A and 526B. In an embodiment, the amplification reagents in the different porous membranes 526A and 526B are configured to perform different nucleic acid amplification reactions, such as to amplify different analytes in the biological sample. In this regard, the amplification porous membranes 526A and 526B can include, e.g., different primer sets, polymerases, and the like, suitable to amplify different target nucleic acid molecules.

While two amplification porous membranes 526A and 526B are illustrated, the number of amplification porous membranes is arbitrary. In this regard, the fluidics components 500 are configured to perform multiple amplification reactions to amplify multiple analytes for downstream detection.

In an embodiment, the amplification porous membranes 526A and 526B are positioned to be in thermal communication with a heater of a planar control layer coupled to the fluidics components 500, such as an amplification heater 368 of the planar control layer 328 of FIGS. 3A-3C. In this regard, the amplification porous membranes 526A and 526B are configured to receive heat from the amplification heaters suitable to facilitate a nucleic acid amplification reaction, such as an isothermal nucleic acid amplification reaction.

The fluidics components 500 are shown to further include additional temperature-actuated valves 502B and 502C disposed in fluid communication with downstream portions of the amplification porous membranes 526A and 526B. In an embodiment, the temperature-actuated valves 502B and 502C is configured to transition from a closed configuration to an open configuration when portions of the temperature-actuated valves 502B and 502C, such as a heat-shrink film defining one or more perforations (not shown, see FIGS. 1A-1D and 2), are heated above a threshold temperature. In an embodiment, the additional temperature-actuated valves 502B and 502C are an example of the temperature-actuated valves 102A, 102B, and 202 discussed further herein with respect to FIGS. 1A-1D and 2. In an embodiment, the threshold temperature is greater than a nucleic acid amplification temperature. In an embodiment, the temperature-actuated valves 502B and 502C are positioned to receive heat from a planar control layer, in accordance with an embodiment of the disclosure, such as planar control layer 328 described further herein with respect to FIGS. 3A-3D.

In the illustrated embodiment, the fluidics components 500 further include detection porous membranes 542A and 542B positioned downstream of the temperature-actuated valves 502B and 502C configured to be in fluid communication with the amplification porous membranes 526A and 526B when the temperature-actuated valves 502B and 502C are in an open configuration. In an embodiment, the detection porous membranes 542A and 542B include a plurality of capture molecules configured to selectively couple to an analyte, such as an analyte in the biological sample and, in some embodiments, amplified in the amplification porous membranes 526A and 526B. In an embodiment, the capture molecules immobilized on the respective detection porous membranes 542A and 542B are configured to selectively bind to different analytes. As above, each of the amplification porous membranes 526A and 526B may be configured to amplify different analytes in a biological sample. In this regard, the detection porous membranes 542A and 542B may be configured to selectively bind to such different analytes. In an embodiment, the detection porous membranes 542A and 542B further include detection reagents suitable for visualizing or otherwise making detectable the immobilized analytes. As discussed further herein with respect to FIGS. 4A-4C, such immobilized analytes coupled to detection reagents may be detected through visual inspection and/or fluorescent detection.

As shown, the fluidics components 500 further include salt pads 550A and 550B in fluid communication with the detection porous membranes 542A and 542B. In an embodiment, the salt pads 550A and 550B include reagents suitable to enhance detection reactions that may occur in downstream portions of the detection porous membranes 542A and 542B.

The fluidics components 500 are shown to further include a waste pad 552 positioned in fluid communication with a downstream portion of the detection porous membranes 542A and 542B and configured to absorb liquid not immobilized on the detection porous membranes 542A and 542B. Such a waste pad 552 is configured to draw liquid through other portions of the fluidics components 500, such as through capillary action.

Methods

In another aspect, the present disclosure provides a method of fluidically coupling two or more porous membranes. In an embodiment, the method includes heating a heat-shrink film defining a perforation and disposed between the two or more porous membranes to contract the heat-shrink film. As discussed further herein with respect to the temperature-actuated valves and devices of the present disclosure, by heating the heat-shrink defining the perforation the heat-shrink film contracts to open the perforation to define an aperture.

Such an aperture may provide a fluid pathway between the two or more porous membranes. In this regard, fluid, such as a liquid including solutes, can pass from one of the two porous membranes through the aperture and into a second of the two or more porous membranes.

In an embodiment, heating the heat-shrink film includes heating the heat-shrink over a threshold temperature sufficient to contract the heat-shrink film. In the threshold temperature is a temperature above a reaction temperature of a chemical reaction occurring in one of the two or more porous membranes. In this regard, the chemical reaction may proceed at the reaction temperature without opening the valve.

In an embodiment, the heat-shrink is a uniaxial heat-shrink film. In an embodiment, the heat-shrink film is a biaxial heat-shrink film. In an embodiment, the heat-shrink film is constrained to limit stress relief in the heat-shrink film.

In an embodiment, the method further includes fluidically coupling additional porous membranes. In embodiment, such fluidic coupling includes heating another portion of the heat-shrink film defining another perforation. In an embodiment, such fluidic coupling includes heating another heat-shrink film defining another perforation. As discussed further herein, such additional heating can be timed to accomplish sequenced reactions, such as reactions based on fluid flow through a fluid path defined by fluidically coupled porous membranes. In an embodiment, such choreographed and controlled heating is performed through the use of a planar control board, such as planar control board 328, as described herein in contact with one or more temperature-actuated valves. In an embodiment, such choreographed and controlled heating is performed through the use of a controller, such as controller 372.

Certain processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While illustrative embodiments have been illustrated and described, it will be appreciated that various changes can be made therein without departing from the spirit and scope of the invention.

The invention claimed is:

1. A temperature-actuated valve comprising:
   a heat-shrink film defining a perforation extending at least partially in a first direction; and
   a leakage-mitigation feature configured to limit fluid flow through the perforation when the valve is in a closed configuration,
   wherein the temperature-actuated valve is configured to open when a portion of the heat-shrink film including the perforation is heated above a threshold temperature to contract the heat-shrink film along a second direction perpendicular to the first direction to define an aperture, in an open configuration, providing a fluid a path through the heat-shrink film.

2. The temperature-actuated valve of claim 1, wherein the leakage-mitigation feature comprises a thermoplastic polymer disposed on a portion of the heat-shrink film including the perforation, the thermoplastic polymer having a melting temperature less than or equal to the threshold temperature.

3. The temperature-actuated valve of claim 2, wherein the thermoplastic polymer is selected from the group consisting of polycaprolactone, polyethylene copolymers, and combinations thereof.

4. The temperature-actuated valve of claim 1, wherein the leakage-mitigation feature comprises a hydrophobic layer disposed on a portion of the heat-shrink film adjacent to the perforation.

5. The temperature-actuated valve of claim 1, wherein the leakage-mitigation feature comprises scoring of the heat-shrink film disposed adjacent to the perforation.

6. The temperature-actuated valve of claim 1, wherein the perforation is a first perforation, and wherein the heat-shrink film further defines a second perforation extending at least partially along the first direction configured to define a second aperture, in an open configuration, providing a second fluid path when the heat-shrink film is heated above the threshold temperature.

7. The temperature-actuated valve of claim 1, wherein the temperature-actuated valve is for use with a porous microfluidic device, and wherein the aperture is configured define a fluid path between a first porous membrane in fluidic contact with the aperture and disposed on a first major side of the heat-shrink film and a second porous membrane in fluidic communication with the perforation and disposed on a second major side of the heat-shrink film opposite the first major side.

8. The temperature-actuated valve of claim 1, wherein the heat-shrink film comprises a uniaxial shape-memory polymer configured to contract substantially along a single direction of the heat-shrink film.

9. The temperature-actuated valve of claim 1, wherein the heat-shrink film is mechanically constrained to limit stress relief.

10. A device comprising:
a first porous membrane;
a second porous membrane;
a temperature-actuated valve separating the first porous membrane and the second porous membrane in a closed configuration, and fluidically coupling the first porous membrane and the second porous membrane in an open configuration, the temperature-actuated valve comprising:
a heat-shrink film defining a perforation extending at least partially in a first direction; and
a leakage-mitigation feature disposed adjacent to the perforation configured to limit fluid flow through the perforation when the valve is in the closed configuration,
wherein the heat-shrink film is configured to contract along a second direction perpendicular to the first direction when the heat-shrink film is heated above a threshold temperature to define, in the open configuration, an aperture providing a fluid a path between the first porous membrane and the second porous membrane; and
a planar control layer in thermal communication with temperature-actuated valve, the planar control layer comprising:
two contact pads being electrically conductive configured to conductively couple to an external power source; and
a conductive trace conductively coupling the two contact pads.

11. The device of claim 10, wherein the temperature-actuated valve is the temperature-actuated valve of claim 1.

12. The device of claim 10, wherein the conductive trace is configured to resistively heat a portion of the heat-shrink film including the perforation when the two contact pads are conductively coupled to the external power source.

13. The device of claim 10, further comprising a positive-temperature-coefficient (PTC) heater in conductive communication with the conductive trace, wherein the PTC heater is configured to heat a portion of the heat-shrink film including the perforation when the two contact pads are conductively coupled to the external power source.

14. The device of claim 13, wherein the PTC heater comprises a PTC ink configured to increase an electrical resistance of the PTC ink at a predetermined temperature.

15. The device of claim 10, further comprising an enclosure defining a sample chamber configured to receive a biological sample and carrying lysis reagents configured to lyse the biological sample, wherein the sample chamber is in fluidic communication with the first porous membrane.

16. The device of claim 15, wherein the threshold temperature is greater than a lysis temperature of the lysis reagents.

17. The device of claim 10, further comprising:
a third porous membrane comprising a plurality of capture molecules configured to selectively couple to an analyte; and
a second valve fluidically separating the second porous membrane and the third porous membrane in a closed configuration, and fluidically coupling the second porous membrane and the third porous membrane in an open configuration.

18. The device of Claim 17, wherein the second valve is a second temperature-actuated valve comprising:
a heat-shrink film defining a perforation extending, at least partially, in a third direction; and
a leakage-mitigation feature disposed adjacent to the perforation configured to limit fluid flow through the perforation when the second temperature-actuated valve is in a closed configuration,
wherein the heat-shrink film is configured to contract along a fourth direction perpendicular to the third direction when the heat-shrink film is heated above a second threshold temperature to define, in an open configuration, an aperture providing a fluid a path between the second porous membrane and the third porous membrane.

19. The device of claim 17, further comprising nucleic acid amplification reagents disposed in the second porous membrane configured to amplify nucleic acid disposed in the second porous membrane.

20. The device of claim 18, wherein the second threshold temperature is greater than a nucleic acid amplification temperature of the nucleic acid amplification reagents.

21. A method of fluidically coupling two or more porous membranes, the method comprising heating a heat-shrink film defining a perforation and disposed between the two or more porous membranes to contract the heat-shrink film and to open the perforation to define an aperture providing a fluid pathway between the two or more porous membranes.

22. The method of claim 21, further comprising heating a thermoplastic polymer disposed on a portion of the heat-shrink film including the perforation above a melting temperature of the thermoplastic polymer.

* * * * *

UNITED STATES PATENT AND TRADEMARK OFFICE
CERTIFICATE OF CORRECTION

PATENT NO. : 10,935,149 B2
APPLICATION NO. : 16/354987
DATED : March 2, 2021
INVENTOR(S) : P. Yager et al.

Page 1 of 1

It is certified that error appears in the above-identified patent and that said Letters Patent is hereby corrected as shown below:

In the Claims

| Column | Line | |
| --- | --- | --- |
| 19 | 23 | "configured define" to -- configured to define -- |

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*